March 26, 1929.  H. L. SNYDER  1,707,148

PLATFORM SCALE ATTACHMENT

Filed Feb. 6, 1928  2 Sheets-Sheet 1

Inventor
*H. L. Snyder*

By *Clarence A. O'Brien*
Attorney

March 26, 1929.  H. L. SNYDER  1,707,148
PLATFORM SCALE ATTACHMENT
Filed Feb. 6, 1928  2 Sheets-Sheet 2

Inventor
H. L. Snyder
By Clarence A. O'Brien
Attorney

Patented Mar. 26, 1929.

1,707,148

UNITED STATES PATENT OFFICE.

HENRY L. SNYDER, OF BOWMANSTOWN, PENNSYLVANIA.

PLATFORM-SCALE ATTACHMENT.

Application filed February 6, 1928. Serial No. 252,295.

The present invention relates to an attachment for use in conjunction with platform scales and has for its principal object to provide a means for accurately indicating the balance.

At the present time, platform scales employ a pivoted beam on which is slidable a poise and to the outer end of which beam is attached a counter poise. Frequently the beam will either be under or over balanced and it is therefore impossible to accurately ascertain the weight of the object or material being weighed. It is therefore one of the principal objects of the present invention to provide an indicator for association with the platform scale an more particularly for cooperation with the supporting loop for the counterpoise whereby the weight can be ascertained regardless of the balance of the pivoted beam that is within the limits of the dial on attachment.

A further object is to provide a dash pot unit for association with a platform scale whereby to render the pivoted beam more steady and to prevent the rapid oscillation of the pivoted beam so that considerable time will be saved in weighing articles upon the scale.

A still further object of the invention is to provide an attachment for platform scales of the above mentioned character which is simple in construction, inexpensive, strong, and durable and further well adapted to the purpose for which it is designed.

Other objects and advantages of the invention will become apparent during the course of the following description taken in connection with the accompanying drawings.

In the accompanying drawings wherein like reference characters indicate like parts throughout the several views:

Figure 4 is a detail perspective view of the pivot for the pointer arm of my indicator, and Figure 5 is a detail view of the bearing for the under balanced plate to which the pointer arm is attached.

Figure 1:
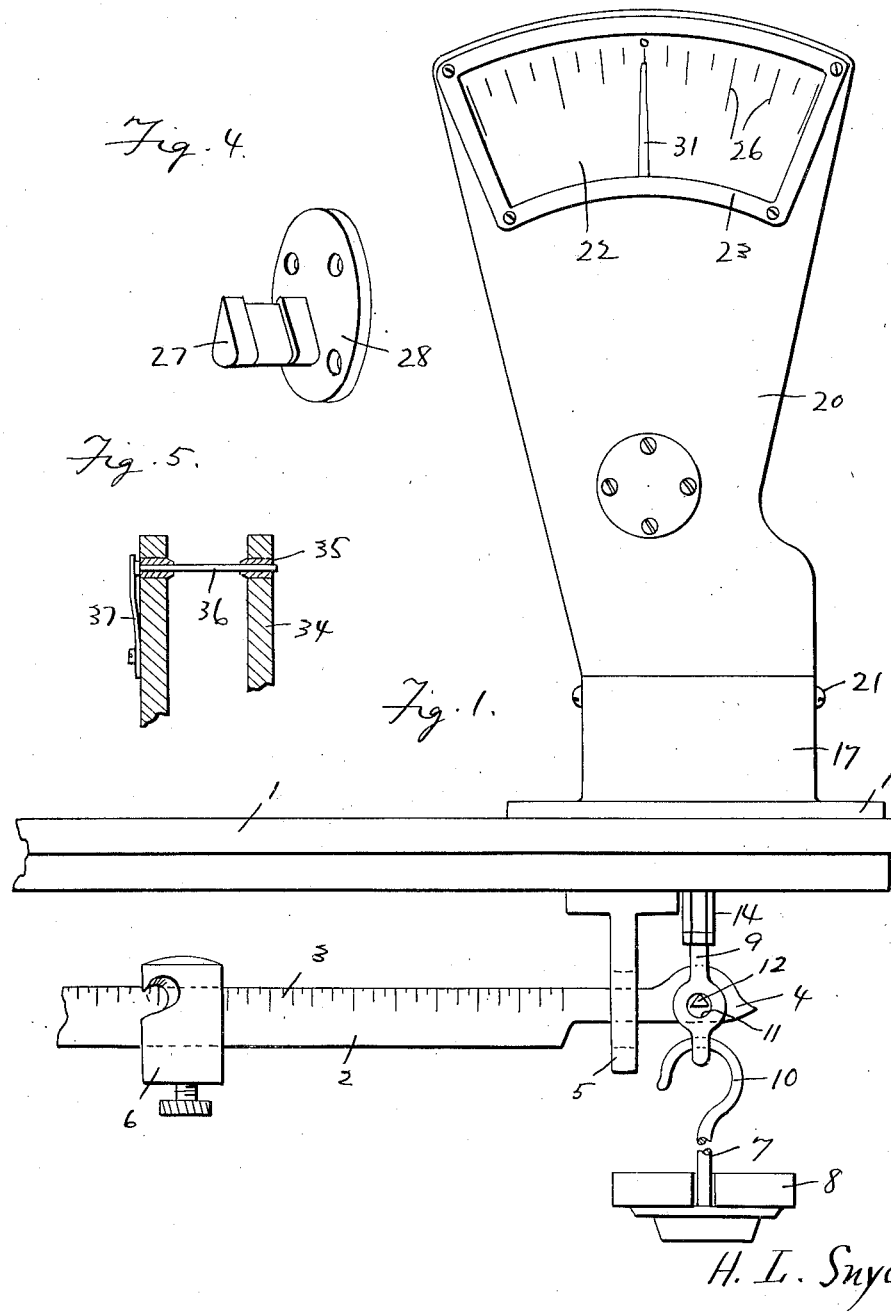
Figure 1 is a fragmentary side elevation of a portion of a platform scale of the conventional construction showing my attachment mounted thereon.

In the drawings wherein for the purpose of illustration is shown the preferred embodiment of my invention, the numeral 1 designates the outer end portion of the horizontal arm of a platform scale of the conventional construction, beneath which arm is arranged the usual pivoted beam 2 that is provided with the graduation or scale 3. The outer end portion 4 of this beam extends through a loop 5 that is suspended from the outer end portion of the horizontal arm 1 in the manner also well known in the art.

The usual poise 6 is slidable along the pivoted beam 2, while the counter poise 7 is adapted to receive the usual counter poise weight such as is shown at 8. This counterpoise is suspended from the lower end of the rod 9.

The lower end of this rod is formed with an eye to receive the hooks 10 of the counter poise 7 and furthermore the lower portion of the rod is formed with an eye 11 that rests on the upper edge of the substantially triangular shaped member 12 that extends laterally from the outer end portion 4 of the pivoted beam 2 in the manner as shown clearly in Figure 1.

The upper end of this rod 9 is threaded and is adapted to be operatively connected to the lower end of the upper rod 13 through the medium of the turn buckle 14. This construction is more clearly disclosed in Figure 2 of the drawings.

Figure 2:
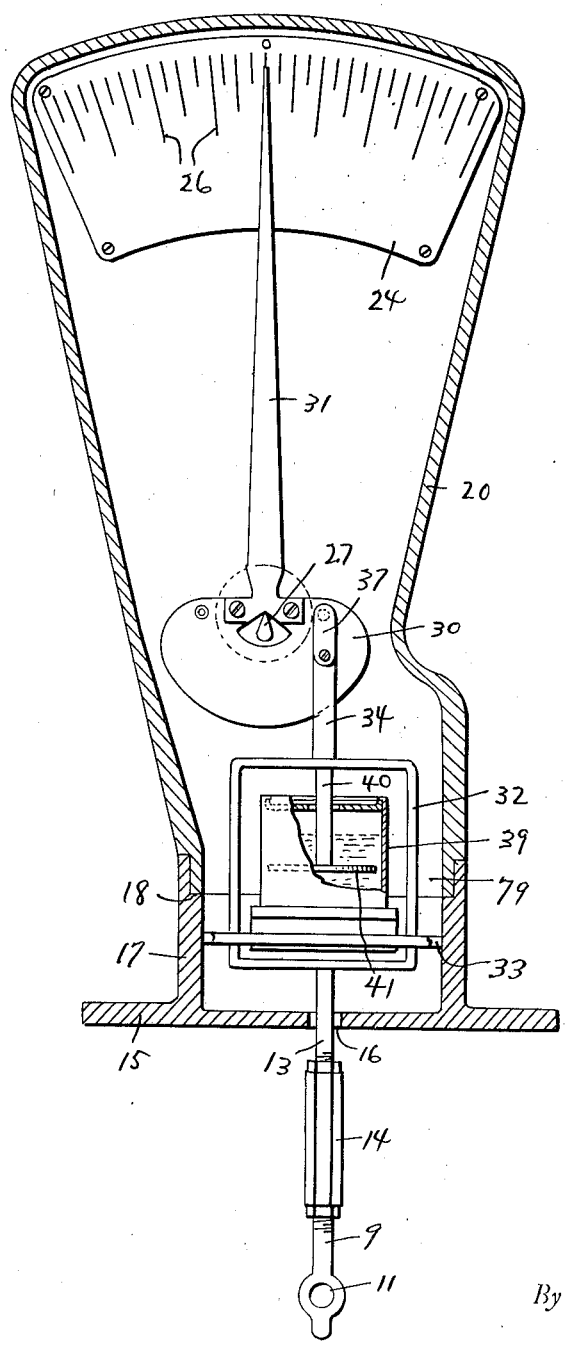
Figure 2 is a sectional view through the casing of the indicator embodying my attachment showing the pivoted pointer arm in a normally properly balanced position and also showing more clearly the dash pot construction.

The upper portion of this rod 13 is adapted to extend through the top of the outer end portion of the horizontal arm 1 and through the bottom of the base 15 that forms a part of my attachment, the base being formed with a central opening 16 to accommodate the rod 13 as clearly illustrated in Figure 2.

The base is secured in a rigid manner on the upper face of the outer end portion of the horizontal arm 1 and formed on the base is the circular upstanding flange 17, the upper edge of which is formed with an annular shoulder 18 on which rests the lower edge of the reduced neck portion 19 of the casing 20. This casing is capable of rotation on the upstanding flange 17 and suitable set screws 21 are provided for securing the casing in any adjusted position.

Figure 3:
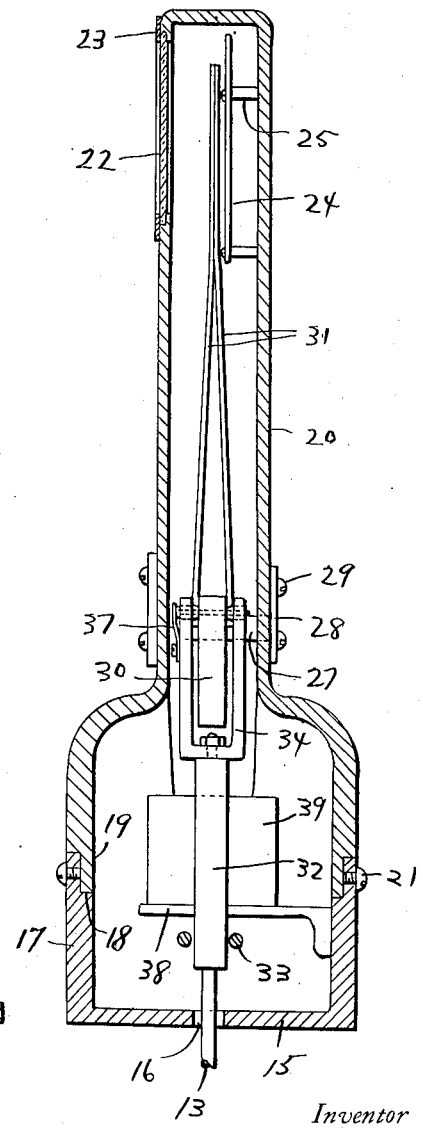
Figure 3 is a vertical section through the indicator taken at right angles to Figure 2.

The casing is provided with a cut out portion in the front face thereof and a glass panel 22 is supported in this cut out portion by means of the frame 23 that is secured on the front face of the casing around the edges of the cut out portion as clearly illustrated in Figures 1 and 3 of the drawings. A segmental plate 24 is secured within the upper portion of the casing directly in alinement with the glass panels 22, the supporting means for the segmental plate being shown at 25 with reference more particularly to Figure 3. A scale 26 is arranged on the front face of this segmental plate, the graduations of the scale being so arranged as to indicate over weight on the left hand side and under weight on the right hand side.

A substantially triangular shaped pivot forming member 27 extends laterally from a circular plate 28 and is adapted for disposition through an opening provided in the rear side of the casing adjacent the lower end portion thereof. The plate 28 is secured on the outer face of the rear side of the casing 20 by any appropriate fastening means shown at 29.

Adapted to be mounted for swinging movement on the upper edge of this triangular shaped member 27 is the under balanced plate 30, the same being formed with a centrally located segmental opening in the upper portion thereof, the apex of which rests on the upper edge of the member 27 as clearly illustrated in Figure 2.

A pointer arm designated generally by the numeral 31 is secured at its lower end to the central portion of the under balanced plate 30 and the upper end of this pointer is adapted to be disposed adjacent the front face of the segmental plate 24 so that said pointer is visible through the glass panel 22.

Also forming a salient part of the present invention is the rectangular shaped frame 32 that is adapted for vertical slidable movement in the lower portion of the casing 20 and also within the upstanding annular flange 17 formed on the base 15. The lower portion of this frame is guided between the transversely extending guide bars or rods shown at 33. The upper end of the rod 13 is fixedly secured to the bottom side of this rectangular frame 32 while a substantially U-shaped member or yoke 34 is secured on the top of the frame. The arms of this yoke 34 are disposed on opposite sides of one end portion of the under balance plate 30 and the upper ends of the arms are formed with registering openings in which are disposed suitable bearings 35 for supporting the transversely extending bolt 36 and a spring element 37 is secured at its lower end on the outer side of one of the arms of the yoke, the upper free end thereof engaging the head of the bolt for normally holding the same in proper position between the upper ends of the arms of the U-shaped member 34. This bolt also extends through an opening in the upper edge portion of the plate 30 whereby an operative connection is provided between the plate and the yoke.

Also forming an important part of the present invention is a dash pot structure for preventing the rapid oscillatory movement of the pivoted beam when the scale is in use, and to this end there is supported within the lower portion of the casing 20 on a suitable bracket designated by the numeral 38, a liquid container 39. A piston rod 40 that is secured at its upper end to the top of the rectangular frame 32 has its lower end extending through the top of this liquid container and carries on its lower end the piston 41 and as the operation of the dash pot is well known, a detailed description thereof is thought unnecessary.

In operation, the pointer arm 31 normally is disposed perpendicular to the arm 1 so that the upper end of the pointer is at the center or zero mark of the scale 26. When the slidable poise 6 has been set at a predetermined point on the beam 2 and the counterpoise weight 8 placed on the counter poise 7, in order to ascertain the weight of the object or material placed on the platform, not shown, of the scale, said beam will swing on its pivot and such movement is retarded by the action of the dash pot structure. Furthermore the outer end of the beam will frequently be overbalanced or under balanced and without an attachment of the character such as is shown and above described, it is impossible for a person to accurately ascertain the exact weight of the material or object placed on the scale. However, by providing an attachment of the character shown and described above, it will be readily obvious that when the outer end of the pivoted beam moves either in an upward or downward direction, such movement will be imparted to the frame 32 through the medium of the interconnected rods 9 and 13, and as a result, the yoke 34 carried by the frame will actuate the underbalanced plate 30 whereby to swing the plate on the pivot member 37 and cause the pointer 31 to traverse the scale 26 arranged on the front face of the segmental plate 24.

Should the beam be overbalanced, then the pointer will swing to the left and thus give the person the exact amount of the weight of the material placed on the scale by combining the readings of the platform scale and the attachment indicator.

In a similar manner, should the beam be underbalanced, then the pointer will move to the right, thus indicate the exact weight. However, when the beam is properly balanced, the pointer will be directly at the center.

Platform scales of the beam type installed alongside of a packer or on any floor subjected to vibration do not show an accurate balance due to the fact that when the beam gets near to balance so that little pressure remains at the end of the beam the vibration of the trigloop causes the beam to swing and show balance when in fact balance is not actually obtained. This aforementioned little pressure means anywhere from 1 oz. to 2 or 3 lbs. on platform depending upon the multiple of scale leverage to that point. The dashpot arrangement forming a part of this invention will govern this condition.

The provision of an indicating device of the above mentioned character can be readily and easily attached to platform scales now generally in use, and furthermore an indicator of this character will at all times be positive and efficient in its operation.

While I have shown the preferred embodiment of my invention, it is to be understood that various changes in the size, shape and arrangement of parts may be resorted to without departing from the spirit of the invention and the scope of the appended claims.

Having thus described the invention, what I claim as new and desire to secure by Letters Patent is:—

1. In combination with a platform scale, wherein the same includes a horizontal arm and a pivoted beam, a poise slidable thereon, a counter poise at the outer end of the beam; of means for indicating when the beam is perfectly balanced, said means comprising a casing mounted on the outer end of the arm of the scale, a dial within the upper portion of the casing, a pointer arm cooperating with the dial, said casing being provided with a window opening in alinement with the dial, an underbalanced plate to which said pointer arm is secured, a pivot for said plate, and an operative connection between said plate and the counter poise to effect the swinging movement of the plate and the pointer arm in either direction depending upon the balance of the pivoted beam.

2. In combination with a platform scale, wherein the same includes a horizontal arm and a pivoted beam, a poise slidable thereon, a counter poise at the outer end of the beam; of means for indicating when the beam is perfectly balanced, said means comprising a casing mounted on the outer end of the arm of the scale, a dial within the upper portion of the casing, a pointer arm cooperating with the dial, said casing being provided with a window opening in alinement with the dial, an underbalanced plate to which said pointer arm is secured, a pivot for said plate, an operative connection between said plate and the counter poise to effect the swinging movement of the plate and the pointer arm in either direction depending upon the balance of the pivoted beam, said last mentioned means comprising a rod connected at its lower end to the counter poise and slidable through the arm of the scale, the upper end of said rod extending into the bottom of the casing, a yoke operatively connected to said plate, and means for connecting the yoke to the upper end of the rod.

3. In combination with a platform scale, wherein the same includes a horizontal arm, a beam pivotally arranged beneath the arm, a poise slidable on the beam, a counter poise operatively connected with the outer end of the beam; of an indicating scale supported above the outer end of the arm, a cooperating pointer arm, a pivotally supported underbalanced plate to which the lower end of the pointer arm is secured, a yoke having its arms disposed on opposite sides of the plate, a pivot element extending through the free ends of the arms of the yoke and through said plate, and an operative connection between the yoke and the counter poise whereby said pointer arm will indicate when the pivoted beam is over balanced or underbalanced.

4. In combination with a platform scale, wherein the same includes a horizontal arm, a beam pivotally arranged beneath the arm, a poise slidable on the beam, a counter poise operatively connected with the outer end of the beam; of an indicating scale supported above the outer end of the arm, a cooperating pointer arm, a pivotally supported underbalanced plate to which the lower end of the pointer arm is secured, a yoke having its arms disposed on opposite sides of the plate, a pivot element extending through the free ends of the arms of the yoke and through said plate, an operative connection between the yoke and the counter poise whereby said pointer arm will indicate when the pivoted beam is over balanced or underbalanced, said last mentioned means comprising a frame, the yoke being secured at its bottom portion to the top of the frame, and a rod slidable through the outer end of the arm, the upper end of the rod being secured to the bottom of the frame, the lower end of the rod being connected to the counter poise.

In testimony whereof I affix my signature.

HENRY L. SNYDER.